(12) United States Patent
Takasu et al.

(10) Patent No.: US 7,288,358 B2
(45) Date of Patent: Oct. 30, 2007

(54) PHOSPHOR PANEL (75) Inventors: Atsunori Takasu, Kanagawa-ken (JP); Seiji Tazaki, Kanagawa-ken (JP); Takeo Kido, Odawara (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/008,225

(22) Filed: Dec. 10, 2004

(65) Prior Publication Data
US 2005/0153228 A1 Jul. 14, 2005

(30) Foreign Application Priority Data
Dec. 12, 2003 (JP) ............... 2003-414265
Sep. 24, 2004 (JP) ............... 2004-277409

(51) Int. Cl.
*G03C 5/16* (2006.01)
*G03C 5/18* (2006.01)
*G03C 5/26* (2006.01)

(52) U.S. Cl. .................... 430/139; 430/449; 252/484.4

(58) Field of Classification Search ................ 430/139; 252/484.4
See application file for complete search history.

(56) References Cited

U.S. PATENT DOCUMENTS

| 4,939,018 | A | * | 7/1990 | Kohda et al. ............. 250/484.4 |
| 2003/0038249 | A1 | | 2/2003 | Hackenschmied et al. |
| 2003/0160188 | A1 | * | 8/2003 | Tazaki ..................... 250/484.4 |
| 2004/0108464 | A1 | * | 6/2004 | Fukui et al. ............. 250/484.4 |

FOREIGN PATENT DOCUMENTS

| JP | 2001-141896 A | 5/2001 |
| JP | 2002-98799 A | 4/2002 |

* cited by examiner

*Primary Examiner*—Geraldina Visconti
(74) *Attorney, Agent, or Firm*—Sughrue Mion, PLLC (57) ABSTRACT

A radiation image storage panel comprises a substrate, a stimulable phosphor layer, which is constituted of a stimulable phosphor, and a transparent water vapor proof film, which is constituted of a water vapor proof layer and a transparent thin film. The substrate, the stimulable phosphor layer, and the transparent water vapor proof film are overlaid in this order. The transparent water vapor proof film is overlaid via an adhesive layer on the stimulable phosphor layer. The transparent thin film has a thickness falling within the range of 1 μm to 10 μm. The radiation image storage panel has good water vapor proof characteristics and is capable of yielding an image of good image quality with a high sensitivity.

17 Claims, 1 Drawing Sheet

PHOSPHOR PANEL

BACKGROUND OF THE INVENTION

1. Field of the Invention

This invention relates to a radiation image storage panel for use in radiation image recording and reproducing techniques utilizing stimulable phosphors.

2. Description of the Related Art

Radiation image recording and reproducing systems utilizing stimulable phosphors have heretofore been known as computed radiography (CR). The radiation image recording and reproducing systems utilizing the stimulable phosphors comprise a radiation image recording apparatus for irradiating radiation carrying image information of an object, such as a human body, and storing a radiation image of the object as a latent image on a layer of the stimulable phosphor. The radiation image recording and reproducing systems utilizing the stimulable phosphors also comprise a radiation image read-out apparatus for exposing the stimulable phosphor layer, on which the latent image of the radiation image has been stored, to stimulating rays, such as a laser beam, which cause the stimulable phosphor layer to emit light in proportion to the amount of energy stored on the stimulable phosphor layer during the exposure of the stimulable phosphor layer to the radiation, and photoelectrically detecting the emitted light in order to acquire an image signal representing the radiation image of the object.

As recording media utilized in the aforesaid radiation image recording and reproducing systems, radiation image storage panels comprising, for example, a substrate having rigidity and a stimulable phosphor layer, which are overlaid one upon another in a layer form, have been known. After image signals have been detected from the radiation image storage panels, the radiation image storage panels are exposed to erasing light, and energy remaining on the stimulable phosphor layers is thus erased. The erased radiation image storage panels are then capable of being used again for the recording of radiation images. In this manner, the radiation image storage panels are capable of being used repeatedly for the recording and readout of radiation images. Ordinarily, such that chemical deterioration of the stimulable phosphor layers or physical impacts to the stimulable phosphor layers due to the repeated use of the radiation image storage panels maybe suppressed, a protective layer is overlaid on the surface of the stimulable phosphor layer, which surface is opposite to the surface that stands facing the substrate.

For example, Japanese Unexamined Patent Publication No. 2001-141896 discloses a radiation image storage panel comprising a fluorine resin film, which has a thickness falling within the range of 1 μm to 10 μm and has a transmittance of at least 90% with respect to light having wavelengths falling within the range of 400 nm to 900 nm and which acts as a protective layer, and a stimulable phosphor layer adhered to the fluorine resin film by use of an adhesive agent. The protective layer constituted of the fluorine resin film has good stainproof characteristics and good water vapor proof characteristics and is a thin film. Therefore, the disclosed radiation image storage panel is capable of yielding an image of good image quality.

Also, a radiation image storage panel, which comprises a protective layer imparted with water vapor proof characteristics, is proposed in, for example, Japanese Unexamined Patent Publication No. 2002-98799. The proposed radiation image storage panel comprises a protective layer, which is formed with a vacuum evaporation process and contains aluminum oxide and/or a silicon oxide. The protective layer has a thickness falling within the range of 0.01 μm to 0.5 μm and does not absorb light having wavelengths falling within the range of 300 nm to 1.000 nm. Also, the protective layer has a water vapor transmission rate of at most 2 $g/m^2/24$ h and an oxygen transmission rate of at most 2 $cc/m^2/24$ h. The protective layer thus has gas barrier characteristics. The protective layer employed in the proposed radiation image storage panel, which is protective layer is constituted of the inorganic substance evaporated layer having the gas barrier characteristics, is capable of being formed as a thin layer, which is free from blurring of image quality due to light scattering. Therefore, the proposed radiation image storage panel is capable of yielding an image having good initial image quality.

Further, a radiation image storage panel having a high water vapor resistance is described in, for example, U.S. Patent Laid-Open No. 20030038249. The radiation image storage panel described in U.S. patent Laid-Open No. 20030038249 comprises two protective layers having different water vapor transmission coefficients (water vapor transmission rates).

The radiation image storage panel disclosed in Japanese Unexamined Patent Publication No. 2001-141896, which comprises the thin fluorine resin film, is capable of yielding an image having good image quality and has good water vapor proof characteristics. However, for technical and economical reasons, it is not always possible to form a thin and uniform fluorine resin film. Therefore, with the radiation image storage panel disclosed in Japanese Unexamined Patent Publication No. 2001-141896, the problems are encountered in that image nonuniformity is apt to occur.

The protective layer (the transparent inorganic layer) employed in the radiation image storage panel proposed in Japanese Unexamined Patent Publication No. 2002-98799 is formed with the vacuum deposition technique. However, in cases where film forming is performed with the vacuum deposition technique on a protective layer substrate (a PET film) or an organic layer, on which the inorganic layer is to be formed, contraction and wrinkles occur with the film. Therefore, an inorganic layer having sufficient water vapor proof performance is not capable of being obtained. Also, the problems occur in that the image quality of the image obtained with the radiation image storage panel is adversely affected by the contraction and the wrinkles occurring with the film. Further, with respect to a stimulable phosphor layer, which is constituted of pillar-shaped crystals and has a gap structure, it is not always possible to form a uniform inorganic evaporated layer.

The protective layer employed in the radiation image storage panel described in U.S. patent Laid-Open No. 20030038249 has a water vapor resistance higher than the water vapor resistances of conventional radiation image storage panels. However, the protective layer employed in the radiation image storage panel described in U.S. patent Laid-Open No. 20030038249 is apt to become thick. Therefore, with the radiation image storage panel described in U.S. Patent Laid-Open No. 20030038249, the image quality of the obtained image will be apt to become bad.

SUMMARY OF THE INVENTION

The primary object of the present invention is to provide a radiation image storage panel, which has good water vapor proof characteristics and is capable of yielding an image of good image quality with a high sensitivity.

The present invention provides a radiation image storage panel, comprising:

i) a substrate, ii) a stimulable phosphor layer, which is constituted of a stimulable phosphor, and iii) a transparent water vapor proof film, which is constituted of a water vapor proof layer and a transparent thin film, the substrate, the stimulable phosphor layer, and the transparent water vapor proof film being overlaid in this order, the transparent water vapor proof film being overlaid via an adhesive layer on the stimulable phosphor layer, wherein the transparent thin film has a thickness falling within the range of 1 µm to 10 µm.

The radiation image storage panel in accordance with the present invention should preferably be modified such that the transparent thin film has a thickness falling within the range of 2 µm to 7 µm.

Also, the radiation image storage panel in accordance with the present invention should preferably be modified such that the transparent water vapor proof film has a water vapor transmission rate of at most 1 $g/m^2/day$. The radiation image storage panel in accordance with the present invention should more preferably be modified such that the transparent water vapor proof film has a water vapor transmission rate of at most 0.2 $g/m^2/day$.

Further, the radiation image storage panel in accordance with the present invention should preferably be modified such that the water vapor proof layer is formed with a vacuum deposition technique, and a coating layer is formed on at least either one of two surfaces of the water vapor proof layer.

Furthermore, the radiation image storage panel in accordance with the present invention should preferably be modified such that the radiation image storage panel further comprises a stimulating ray anti-reflection layer. Also, the radiation image storage panel in accordance with the present invention should preferably be modified such that the radiation image storage panel further comprises an emitted light anti-reflection layer. Further, at least one of the layers constituting the radiation image storage panel, which layers are other than the stimulable phosphor layer, should preferably be colored so as to absorb the stimulating rays or the light emitted by the stimulable phosphor layer.

Further, the radiation image storage panel in accordance with the present invention should preferably be modified such that the stimulable phosphor is a pillar-shaped crystal. In such cases, the adhesive layer should preferably have a layer thickness falling within the range of 0.3 µm to 2 µm.

The radiation image storage panel in accordance with the present invention should preferably be obtained with a process comprising the steps of:

a) laminating the transparent thin film and a peelable film with each other, a laminated film being thereby obtained, b) overlaying the water vapor proof layer on the side of the transparent thin film of the laminated film, the transparent water vapor proof film, which is constituted of the transparent thin film and the water vapor proof layer, being thereby formed, c) overlaying the transparent water vapor proof film on the stimulable phosphor layer via the adhesive layer, and d) separating the peelable film from the transparent water vapor proof film.

The radiation image storage panel in accordance with the present invention comprises the substrate, the stimulable phosphor layer, which is constituted of the stimulable phosphor, and the transparent water vapor proof film, which is constituted of the water vapor proof layer and the transparent thin film. The substrate, the stimulable phosphor layer, and the transparent water vapor proof film are overlaid in this order. The transparent water vapor proof film is overlaid via the adhesive layer on the stimulable phosphor layer. Also, the transparent thin film has a thickness falling within the range of 1 µm to 10 µm. Therefore, the radiation image storage panel in accordance with the present invention is capable of yielding an image having a good sharpness. Also, with the radiation image storage panel in accordance with the present invention, the water vapor proof layer prevents the stimulable phosphor from deteriorating due to absorption of water vapor. Accordingly, the radiation image storage panel in accordance with the present invention exhibits little deterioration in image quality during a long period of use.

Particularly, the radiation image storage panel in accordance with the present invention may be obtained with the process comprising the steps of: (a) laminating the transparent thin film and the peelable film with each other, the laminated film being thereby obtained, (b) overlaying the water vapor proof layer on the side of the transparent thin film of the laminated film, the transparent water vapor proof film, which is constituted of the transparent thin film and the water vapor proof layer, being thereby formed, (c) overlaying the transparent water vapor proof film on the stimulable phosphor layer via the adhesive layer, and (d) separating the peelable film from the transparent water vapor proof film. In such cases, the transparent thin film does not suffer from wrinkling. Also, by virtue of the use of the peelable film, even though the thickness of the transparent thin film is small, the water vapor proof layer is capable of being formed uniformly. Therefore, the radiation image storage panel in accordance with the present invention is capable of yielding an image having a high sharpness and good image quality and is capable of exhibiting good water vapor proof characteristics.

Also, the radiation image storage panel in accordance with the present invention should preferably be modified such that the transparent water vapor proof film has a water vapor transmission rate of at most 1 $g/m^2/day$. The radiation image storage panel in accordance with the present invention should more preferably be modified such that the transparent water vapor proof film has a water vapor transmission rate of at most 0.2 $g/m^2/day$. In such cases, the water vapor proof characteristics of the radiation image storage panel in accordance with the present invention are capable of being enhanced even further. Further, with the radiation image storage panel in accordance with the present invention, wherein the coating layer is formed on at least either one of the two surfaces of the water vapor proof layer, the water vapor proof characteristics of the radiation image storage panel are capable of being enhanced even further.

With the radiation image storage panel in accordance with the present invention, wherein the stimulable phosphor is a pillar-shaped crystal, the sharpness of the image obtained with the radiation image storage panel is capable of being enhanced even further. Also, with the radiation image storage panel in accordance with the present invention, wherein the stimulable phosphor is a pillar-shaped crystal, and wherein the adhesive layer has a layer thickness falling within the range of 0.3 µm to 2 µm, an image free from blurring is capable of being obtained.

With the radiation image storage panel in accordance with the present invention, wherein the radiation image storage panel further comprises the stimulating ray anti-reflection layer, in cases where energy of the stimulating rays is set to be high so as to enhance the sensitivity, the occurrence of interference of the stimulating rays is capable of being suppressed. Therefore, an image free from nonuniformity is capable of being obtained. Also, in cases where image readout from the radiation image storage panel in accordance with the present invention is performed by use of a line scanner, and the radiation image storage panel further comprises the emitted light anti-reflection layer, since intralayer propagation of the light emitted by the stimulable phosphor is capable of being suppressed, the sharpness of the image obtained with the radiation image storage panel is capable of being enhanced even further.

DESCRIPTION OF THE PREFERRED EMBODIMENTS

The present invention will hereinbelow be described in further detail with reference to the accompanying drawings.

Figures 1, 2A:
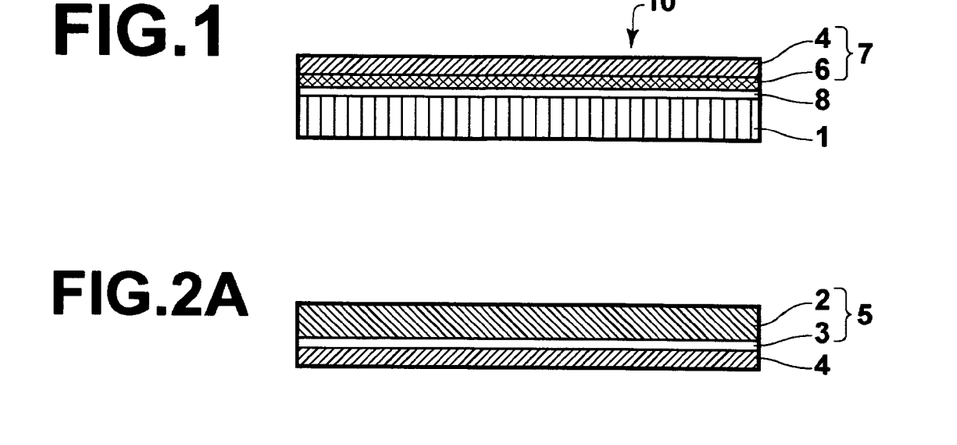
FIG. 1 is a schematic sectional view showing an embodiment of the radiation image storage panel in accordance with the present invention.
FIGS. 2A to 2E are schematic views showing an example of a process for producing the embodiment of the radiation image storage panel in accordance with the present invention.

FIG. 1 is a schematic sectional view showing an embodiment of the radiation image storage panel in accordance with the present invention. As illustrated in FIG. 1, a radiation image storage panel 10, which is an embodiment of the radiation image storage panel in accordance with the present invention, comprises a stimulable phosphor layer 1, in which the stimulable phosphor has a pillar-shaped crystal structure. The radiation image storage panel 10 also comprises a transparent water vapor proof film 7, which is constituted of a water vapor proof layer 6 and a transparent thin film 4. The transparent water vapor proof film 7 is overlaid on the stimulable phosphor layer 1 via an adhesive layer 8. The transparent thin film 4 has a film thickness falling within the range of 1 μm to 10 μm, and should preferably have a film thickness falling within the range of 2 μm to 7 μm. If the thickness of the transparent thin film 4 is larger than 10 μm, the sharpness of an image obtained with the radiation image storage panel 10 will become low. If the thickness of the transparent thin film 4 is smaller than 1 μm, sufficient functions for protecting the stimulable phosphor layer 1 will not be capable of being obtained. Also, the layer thickness of the adhesive layer 8 should preferably fall within the range of 0.3 μm to 2 μm. If the layer thickness of the adhesive layer 8 is smaller than 0.3 μm, sufficient adhesion between the water vapor proof layer 6 and the stimulable phosphor layer 1 will not be capable of being obtained. If the layer thickness of the adhesive layer 8 is larger than 2 μm, light scattering within the adhesive layer 8 will occur, and the obtained image will be apt to blur.

With the radiation image storage panel in accordance with the present invention, wherein the film thickness of the transparent thin film is small, an image having a high sharpness is capable of being obtained. Also, with the radiation image storage panel in accordance with the present invention, the water vapor proof layer prevents the stimulable phosphor from deteriorating due to absorption of water vapor. Therefore, the radiation image storage panel in accordance with the present invention exhibits little deterioration in image quality during a long period of use. In particular, in cases where the water vapor proof layer 6 is sandwiched between the adhesive layer 8 and the transparent thin film 4 as in the cases of the radiation image storage panel 10 illustrated in FIG. 1, the water vapor proof layer 6 is not apt to suffer from physical impacts, and the water vapor proof characteristics are capable of being kept over a long period of time.

Figure 2B:
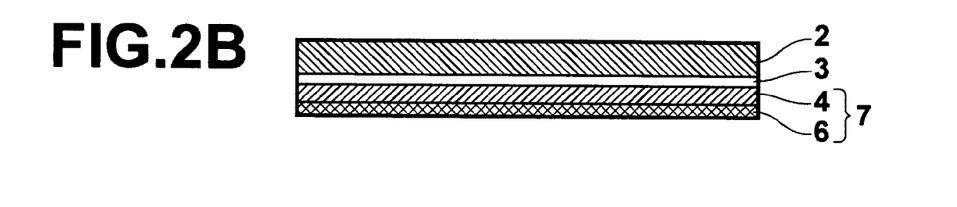
Figure 2C:
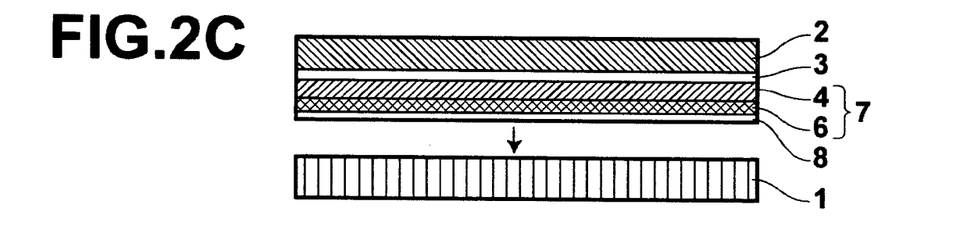
Figure 2D:
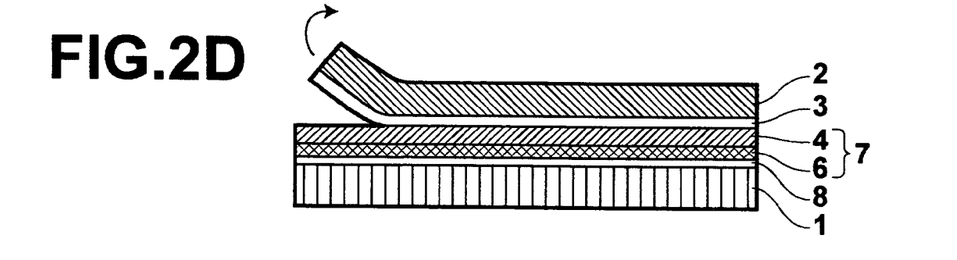
Figure 2E:
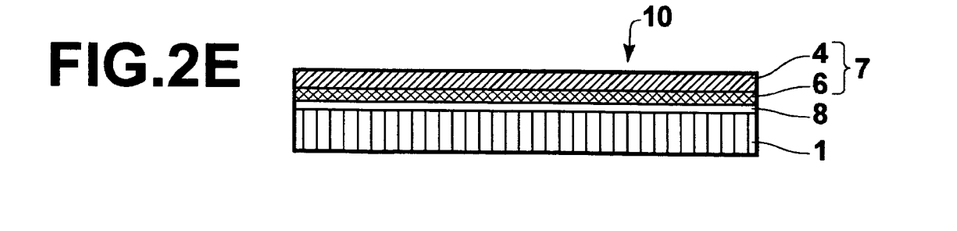

FIGS. 2A to 2E are schematic views showing an example of a process for producing the embodiment of the radiation image storage panel in accordance with the present invention. Firstly, as illustrated in FIG. 2A, a peelable film 5, which is constituted of a peelable film base material 2 and a tacky layer 3, and the transparent thin film 4 are laminated together. In this manner, a laminated film is formed. Thereafter, as illustrated in FIG. 2B, the water vapor proof layer 6 is overlaid on the side of the transparent thin film 4, which has been laminated with the peelable film 5. In this manner, the transparent water vapor proof film 7, which is constituted of the transparent thin film 4 and the water vapor proof layer 6, is formed. Also, as illustrated in FIG. 2C, the adhesive layer 8 is overlaid on the side of the water vapor proof layer 6 of the transparent water vapor proof film 7. Thereafter, the stimulable phosphor layer 1 and the transparent water vapor proof film 7 are laminated together, such that the adhesive layer 8 stands facing the stimulable phosphor layer 1. After the lamination, as illustrated in FIG. 2D, the peelable film 5 is separated from the transparent thin film 4 of the transparent water vapor proof film 7. As a result, as illustrated in FIG. 2E, the radiation image storage panel 10, in which the transparent thin film 4 and the water vapor proof layer 6 protect the stimulable phosphor layer 1, is obtained.

With the process for producing the radiation image storage panel 10 described above, the water vapor proof layer 6 is overlaid on the transparent thin film 4, which has been laminated with the peelable film 5. Therefore, the transparent thin film 4 does not suffer from the wrinkling. Also, by virtue of the use of the peelable film 5, even though the thickness of the transparent thin film 4 is small, the water vapor proof layer 6 is capable of being formed uniformly. Therefore, it is possible to obtain the radiation image storage panel 10, which is capable of yielding an image having a high sharpness and good image quality and is capable of exhibiting good water vapor proof characteristics.

In the process illustrated in FIGS. 2A to 2E, after the transparent water vapor proof film 7 has been laminated with the stimulable phosphor layer 1, the peelable film 5 is separated from the transparent water vapor proof film 7. Alternatively, before the transparent water vapor proof film 7 is overlaid on the stimulable phosphor layer 1, the peelable film 5 may be separated from the transparent water vapor proof film 7. In this manner, the transparent thin film 4 having been provided with the water vapor proof layer 6 may be overlaid on the stimulable phosphor layer 1.

Also, in the process illustrated in FIGS. 2A to 2E, the one water vapor proof layer 6 is overlaid on one side of the transparent thin film 4. Alternatively, each of two water vapor proof layers may be overlaid on one of two sides of the transparent thin film 4. Further, the transparent water vapor proof film 7, which is constituted of the transparent thin film 4 and the water vapor proof layer 6, should preferably have a water vapor transmission rate of at most 1 g/m²/day. The transparent water vapor proof film 7 should more preferably have a water vapor transmission rate of at most 0.2 g/m²/day. For the adjustment of the water vapor transmission rate of the transparent water vapor proof film 7, the material for the transparent thin film 4 and the material for the water vapor proof layer 6 may be selected appropriately. Also, for the adjustment of the water vapor transmission rate of the transparent water vapor proof film 7, several water vapor proof layers may be overlaid.

Further, in cases where the radiation image storage panel in accordance with the present invention is provided with a coating layer, a stimulating ray anti-reflection layer, an emitted light anti-reflection layer, and the like, the layers may be overlaid by use of the peelable film described above.

As the transparent thin film 4, it is possible to employ one of various known films, which have a required strength, transparency, and chemical stability. Specifically, the material for the transparent thin film 4 may be selected arbitrarily from known materials, such as a polyethylene terephthalate, a polyethylene naphthalate, a polyamide, a polyimide, an aramid resin, a polycarbonate, a polyethylene, a polyurethane, a polypropylene, a polyvinylidene chloride, a cyclic olefin type of plastic material, a norbornene type of plastic material, and an amorphous polyester type of plastic material having a fluorene skeleton.

The water vapor proof layer 6 may be constituted of an inorganic layer of a metal oxide, a metal nitride, and a metal oxynitride. More specifically, the water vapor proof layer 6 should preferably be a transparent layer constituted of an inorganic material, which exhibits little light absorption with respect to light having wavelengths falling within the range of 300 nm to 1,000 nm and has gas barrier characteristics. Examples of the inorganic materials, which exhibit little light absorption with respect to the light having wavelengths falling within the range of 300 nm to 1,000 nm, include silicon oxide, silicon nitride, aluminum oxide, aluminum nitride, zirconium oxide, tin oxide, silicon oxynitride, and aluminum oxynitride. Among the above-enumerated inorganic materials, aluminum oxide, silicon oxide, and silicon oxynitride have a high light transmittance and good gas barrier characteristics. Specifically, with aluminum oxide, silicon oxide, or silicon oxynitride, a dense film free from cracks and micro-pores is capable of being formed. Therefore, aluminum oxide, silicon oxide, and silicon oxynitride are more preferable as the inorganic materials. In cases where two or more water vapor proof layers are overlaid, the water vapor proof layers may be constituted of different materials. Alternatively, the water vapor proof layers may be constituted of an identical material.

The water vapor proof layer 6 may be overlaid directly on the transparent thin film 4 with a dry process, e.g. a vacuum deposition technique capable of forming a thin film in a vacuum, such as a vacuum evaporation technique, a sputtering technique, a physical vapor deposition technique (i.e., the PVD technique), or a chemical vapor deposition technique (i.e., the CVD technique). Alternatively, the water vapor proof layer 6 may be overlaid directly on the transparent thin film 4 with a wet process, such as a sol-gel technique. With any of the above-enumerated techniques, the transparency and the barrier characteristics of the obtained inorganic layer do not vary largely. Therefore, the technique for forming the water vapor proof layer 6 may be selected appropriately from the above-enumerated techniques.

The radiation image storage panel in accordance with the present invention should preferably be modified such that a coating layer is formed on at least either one of the two surfaces of the water vapor proof layer 6. In cases where the water vapor proof layer 6 is formed on a top surface of the coating layer, since the water vapor proof layer 6 is formed on the top surface of the coating layer, which top surface does not have fine depressed or protruding regions, a dense water vapor proof layer is capable of being formed, and water vapor proof characteristics are capable of being enhanced. Also, in cases where the coating layer is formed on a top surface of the water vapor proof layer 6, since fine cracks, and the like, of the water vapor proof layer 6 are filled with the coating layer, the water vapor proof characteristics are capable of being enhanced.

As the coating layer described above, one of various known resin layers may be employed. For example, the coating layer may be formed with a process, wherein a low-molecular weight material, such as an acrylic type of monomer, is applied and then cured with ultraviolet rays or electron rays. Alternatively, the coating layer may be formed with a process, wherein a polyvinyl alcohol (PVA)/SiO$_2$ hybrid layer is applied with a sol-gel technique. As another alternative, the coating layer may be formed with a process, wherein a resin, such as an acrylic type of resin or a polyvinyl alcohol type of resin, is applied and then dried. The process, wherein a low-molecular weight material, such as an acrylic type of monomer, is applied and then cured with ultraviolet rays or electron rays, and the process, wherein a polyvinyl alcohol (PVA)/SiO$_2$ hybrid layer is applied with a sol-gel technique, are appropriate for the cases where the water vapor proof layer 6 is to be formed on the top surface of the coating layer. Also, the process, wherein a resin, such as an acrylic type of resin or a polyvinyl alcohol type of resin, is applied and then dried, is appropriate for the cases where the coating layer is to be formed on the top surface of the water vapor proof layer 6.

At the time of radiation image readout from the radiation image storage panel, on which the radiation image has been stored, energy of the stimulating rays is often set to be high such that the sensitivity may be enhanced. In such cases, the problems often occur in that interference of the stimulating rays occurs, and nonuniformity in image is caused to occur. In order for the problems described above to be eliminated, the radiation image storage panel in accordance with the present invention should preferably be provided with the stimulating ray anti-reflection layer, which is capable of suppressing the spread of the stimulating rays.

With a certain type of a radiation image read-out apparatus utilized for a radiation image recording and reproducing system, a radiation image storage panel, on which a radiation image has been stored, is scanned with a spot-shaped laser beam acting as the stimulating rays, and the light, which is emitted by the radiation image storage panel in proportion to the amount of energy stored on the radiation image storage panel during the exposure of the radiation image storage panel to radiation, is collected by a light guide member. (In such cases, the emitted light is detected by being divided into pixels with time series division interlocked with the scanning.) In such cases, only the spread of the stimulating rays constitutes a factor which adversely affects the sharpness of the image detected from the radiation image storage panel. With a different type of a radiation image read-out apparatus utilized for a radiation image recording and reproducing system (as described in, for example, Japanese Unexamined Patent Publication No. 2000-66316), such that the time required to detect the light emitted by the radiation image storage panel may be kept short, such that the size of the radiation image read-out apparatus may be kept small, and such that the cost maybe kept low, a line light source for irradiating line-like stimulating rays (i.e., a line-like laser beam) is employed, and the light emitted by the radiation image storage panel is detected for each of pixels by use of a line scanner acting as photoelectric read-out means. In the cases of the aforesaid different type of the radiation image read-out apparatus, wherein the line scanner is employed, both the spread (i.e., the line width) of the stimulating rays and the spread of the light emitted by the radiation image storage panel constitute the factors which adversely affect the sharpness of the image detected from the radiation image storage panel. Therefore, in cases where the radiation image storage panel is to be utilized for the radiation image read-out apparatus, wherein the radiation image is read out with the line scanner, the radiation image storage panel should preferably be provided with the emitted light anti-reflection layer for preventing the reflection of the light emitted by the stimulable phosphor.

As described above, the radiation image storage panel in accordance with the present invention should preferably be provided with at least one stimulating ray anti-reflection layer described above. Also, the radiation image storage panel in accordance with the present invention should preferably be provided with at least one emitted light anti-reflection layer described above. By the provision of the stimulating ray anti-reflection layer, the surface reflectivity with respect to the stimulating rays having wavelengths, which fall within the stimulation wavelength range for the stimulable phosphor contained in the radiation image storage panel, at an incidence angle falling within the range of 0° to 60° should preferably be set to be at most 5%, should more preferably be set to be at most 3%, should most preferably be set to be at most 2%, and should particularly preferably be set to be at most 1%. Also, by the provision of the emitted light anti-reflection layer, the surface reflectivity with respect to the emitted light having wavelengths, which fall within the light emission wavelength range of the stimulable phosphor contained in the radiation image storage panel, at an incidence angle falling within the range of 0° to 60° should preferably be set to be at most 5%, should more preferably be set to be at most 3%, should most preferably be set to be at most 2%, and should particularly preferably be set to be at most 1%.

As the anti-reflection layer, an evaporated layer or a sputtered layer constituted of an inorganic material, such as an inorganic oxide, an inorganic oxynitride, an inorganic nitride, or an inorganic fluoride, is preferable. In cases where one anti-reflection layer is to be provided, the one anti-reflection layer should preferably be a low refractive index layer. In cases where a plurality of anti-reflection layers are to be provided, at least one low refractive index layer and at least one high refractive index layer should preferably be overlaid one upon the other. The low refractive index layer should preferably be constituted of magnesium fluoride, silicon oxide, or the like. The high refractive index layer should preferably be constituted of titanium oxide, zirconium oxide, tin oxide, indium oxide, aluminum oxide, or the like. In this embodiment, the anti-reflection layer is provided as a layer independent of the water vapor proof layer. Alternatively, the water vapor proof layer, which is capable of acting also as the anti-reflection layer, should preferably be employed.

In order for the surface reflectivity of the radiation image storage panel falling within the range described above to be obtained, for example, an anti-reflection layer, wherein organic fine particles and/or inorganic fine particles are contained in a resin, and wherein micro voids are formed among the fine particles, may be utilized. The thickness of the anti-reflection layer should preferably fall within the range of 50 nm to 400 nm, and should more preferably fall within the range of 50 nm to 200 nm. Also, haze of the anti-reflection layer should preferably fall within the range of 3% to 30%, should more preferably fall within the range of 5% to 20%, and should most preferably fall within the range of 7% to 20%.

As the organic fine particles, for example, fine particles of various resins, which fine particles have a mean particle diameter of at most 1 µm, may be utilized. Examples of preferable organic fine particles include PMMA fine particles, such as MP Series (supplied by Soken Kagaku K.K.), MX Series (supplied by Soken Kagaku K.K.), and Micro Gel Series (supplied by Nippon Paint Co., Ltd.); melamine resin fine particles, such as Eposter (supplied by Nippon Shokubai Kagaku Kogyo Co., Ltd.); silicone resin fine particles, such as Tospearl (supplied by GE Toshiba Silicone Co.); and Teflon resin fine particles, such as LD Series (supplied by Daikin Industries, Ltd.) and Lubron.

If the particle diameters of the inorganic fine particles are large, forward scattering will increase. If the particle diameters of the inorganic fine particles are larger than 200 nm, coloring will occur with scattered light. Therefore, the mean particle diameter of the inorganic fine particles should preferably fall within the range of 0.5 nm to 200 nm, should more preferably fall within the range of 1 nm to 100 nm, should most preferably fall within the range of 3 nm to 70 nm, and should particularly preferably fall within the range of 5 nm to 40 nm. The particle diameters of the inorganic fine particles should preferably be as uniform as possible (i.e., the inorganic fine particles should preferably be monodisperse). The inorganic fine particles should preferably be constituted of a metal oxide, a metal nitride, a metal sulfide, a metal halide, or the like. The inorganic fine particles should more preferably be constituted of a metal oxide or a metal halide. The inorganic fine particles should most preferably be constituted of a metal oxide or a metal fluoride.

Examples of preferable metals include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, and Ni. Among the above-enumerated metals, Mg, Ca, B, and Si are more preferable. The inorganic compound may be a compound of a single kind of metal selected from the above-enumerated metals. Alternatively, the inorganic compound may contain two kinds of metals selected from the above-enumerated metals. In particular, the inorganic compound should preferably be an alkali metal fluoride (such as NaF or KF), an alkaline earth metal fluoride (such as $CaF_2$ or $MgF_2$), orsilicondioxide ($SiO_2$). The inorganic fine particles should preferably have the characteristics such that characteristic absorption does not occur with respect to light having wavelengths falling within the range of 400 nm to 900 nm. The inorganic fine particles should more preferably have the characteristics such that absorption does not occur with respect to light having wavelengths, which fall within the wavelength range of the stimulating rays, and light having wavelengths, which fall within the wavelength range of the light emitted by the stimulable phosphor.

The inorganic fine particles should preferably be amorphous. The inorganic fine particles may be directly synthesized as a dispersion with a sol-gel technique (as described in, for example, Japanese Unexamined Patent Publication No. 53(1978)-112732 or Japanese Patent Publication No. 57(1982)-9051) or a precipitation technique (as described in, for example, Applied Optics, 27, p. 3356, 1988). Alternatively, the inorganic fine particles may be produced with a process, wherein powder obtained with a drying and precipitating technique is mechanically ground, and a dispersion is thus obtained. It is also possible to utilize commercially available inorganic fine particles (e.g., a silicon dioxide sol). For the formation of the anti-reflection layer, the inorganic fine particles should preferably be used by being dispersed in an appropriate dispersing medium. As the dispersing medium, water, an alcohol (e.g., methanol, ethanol, or isopropyl alcohol), or a ketone (e.g., methyl ethyl ketone, or methyl isobutyl ketone) is preferable. The proportion of the inorganic fine particles should preferably fall within the range of 50% by weight to 95% by weight with respect to the total amount of the anti-reflection layer, should more preferably fall within the range of 60% by weight to 90% by weight with respect to the total amount of the anti-reflection layer, and should most preferably fall within the range of 70% by weight to 90% by weight with respect to the total amount of the anti-reflection layer.

The anti-reflection layer should preferably contain a polymer (a resin) in a proportion falling within the range of 5% by weight to 50% by weight. The polymer has the functions for adhering the inorganic fine particles to one another and keeping the structure of the formed anti-reflection layer containing microvoids. The proportion of the polymer should preferably be adjusted such that the micro voids may not be filled up, and the strength of the anti-reflection layer may be kept. The proportion of the polymer should more preferably fall within the range of 10% by weight to 30% by weight with respect to the total amount of the anti-reflection layer.

In order for the inorganic fine particles to be adhered to one another with the polymer, the polymer may be bound to a surface treating agent for the inorganic fine particles. Alternatively, the inorganic fine particles may be taken as cores, and a shell polymer may be formed around the cores. As another alternative, the polymer may be utilized as a binder for the binding among the inorganic fine particles.

The peelable film base material 2 constituting the peelable film 5, which is to be separated from the transparent thin film 4 of the radiation image storage panel 10, need not be transparent. The thickness of the peelable film base material 2 should preferably fall within the range of 10 μm to 500 μm, and should more preferably fall within the range of 20 μm to 150 μm. If the thickness of the peelable film base material 2 is smaller than 10 μm, the peelable film base material 2 will become difficult to process at the time of the lamination with the transparent thin film 4. If the thickness of the peelable film base material 2 is larger than 500 μm, the laminated film having been obtained from the lamination of the peelable film base material 2 and the transparent thin film 4 with each other will become difficult to wind up.

Examples of preferable materials for the formation of the peelable film base material 2 include various types of plastic materials, e.g., an olefin type of plastic material, such as a polyethylene or a polypropylene; a vinyl type of plastic material, such as a polyvinyl chloride or a polyacrylonitrile; a polyester type of plastic material, such as a polyethylene terephthalate or a polybutylene terephthalate; a polyurethane type of plastic material; an acrylic type of plastic material; and a polycarbonate containing bisphenol A as the bisphenol constituent.

Examples of preferable materials for the formation of the peelable film base material 2 also include various types of plastic materials, e.g., a polyarylate, a polycarbonate, and a polyester carbonate, wherein a bisphenol constituent, which has a substituted or unsubstituted cycloalkylidene group, an alkylidene group having at least five carbon atoms, or an aralkylene group, as part of the bisphenol constituent. Specific examples of preferable materials for the formation of the peelable film base material 2 include various types of plastic materials, e.g., a polycarbonate, a polyarylate, and a polyester carbonate, which have 1,1-bis(4-hydroxyphenyl)-cyclohexane, 1,1-bis(4-hydroxyphenyl)-3,3,5-trimethylcyclohexane, 3,3-bis(4-hydroxyphenyl)-pentane, 4,4-bis(4-hydroxyphenyl)-heptane, or bis(4-hydroxyphenyl)-phenylmethane as the bisphenol constituent.

Examples of preferable materials for the formation of the peelable film base material 2 further include a polyether sulfone, a polysulfone, a polyamide, and cellulose triacetate. Examples of preferable materials for the formation of the peelable film base material 2 still further include a cyclic olefin type of plastic material, a norbornene type of plastic material, and an amorphous polyester type of plastic material having a fluorene skeleton.

In particular, the peelable film base material 2 should preferably be a film constituted of a polyolefin type of plastic material, such as a polyethylene or a polypropylene, or a polyester type of plastic material, such as a polyethylene terephthalate or a polybutylene terephthalate.

The tacky layer 3 is formed on one surface of the peelable film base material 2, and the peelable film 5 is thereby formed. As the material for the formation of the tacky layer 3, a known acrylic type of tacky agent or a known silicon type of tacky agent may be utilized. With certain kinds of the tacky agents, it often occurs that foaming occurs during processing. Also it often occurs that the adhesion strength becomes large, and it becomes difficult for the peelable film 5 to be separated from the transparent thin film 4. Therefore, it is necessary for the tacky agent to be selected from the tacky agents, which are capable of enduring the processing conditions. Also, if part of the tacky agent remains on the surface of the transparent thin film 4 when the peelable film 5 is separated from the transparent thin film 4, the problems will occur in that the transparency is lost, and adverse effects occur on the image quality or sharpness of the image obtained with the radiation image storage panel. Therefore, it is necessary that the tacky agent be capable of being separated from the transparent thin film 4 together with the peelable film base material 2. Accordingly, before the processing with the tacky agent is performed on the peelable film base material 2, pre-processing for enhancing the affinity with the tacky agent, such as corona processing, should preferably be performed on the tacky agent processing surface of the peelable film base material 2.

In cases where there is no risk that the tacky agent will remain on the surface of the transparent thin film 4 at the time of the separation from the surface of the transparent thin film 4, the tacky agent processing may first be performed on the transparent thin film 4, and then the peelable film base material 2 may be laminated with the tacky agent processing surface of the transparent thin film 4. Also, from the view point of stabilizing the quality of the laminated film, it is preferable that the film is heated at the time of the lamination. Further, if inclusion of foreign substances occurs during the lamination, the foreign substances will be transferred to the transparent thin film 4 during the processing, and optical defects will occur. Therefore, known countermeasures for preventing the inclusion of the foreign substances should preferably be performed with respect to the film and environment.

The force required to separate the peelable film 5, which has been subjected to the tacky agent processing, from the transparent thin film 4 should preferably be comparatively small. However, if the force required to separate the peelable film 5 from the transparent thin film 4 is markedly small, the problems with regard to foaming, and the like, will occur during the processing of the film. Also, if the force required to separate the peelable film 5 from the transparent thin film 4 is markedly large, the problems will occur in that the film will be deformed at the time of the separation of the peelable film 5 from the transparent thin film 4. Therefore, the separation strength should preferably fall within the range of 10 g/25 mm to 70 g/25 mm, and should more preferably fall within the range of 15 g/25 mm to 50 g/25 mm.

Examples of the stimulable phosphors, which may be employed in the stimulable phosphor layer of the radiation image storage panel in accordance with the present invention, include the following:

a phosphor represented by the formula SrS:Ce,Sm; SrS:Eu, Sm; ThO$_2$:Er; or La$_2$O$_2$S:Eu, Sm, as described in U.S. Pat. No. 3,859,527, a phosphor represented by the formula ZnS:Cu,Pb; BaO·xAl$_2$O$_3$:Eu wherein $0.8 \leq x \leq 10$; M$^{II}$O·xSiO$_2$:A wherein M$^{II}$ is Mg, Ca, Sr, Zn, Cd, or Ba, A is Ce, Tb, Eu, Tm, Pb, Tl, Bi, or Mn, and x is a number satisfying $0.5 \leq x \leq 2.5$; or LnOX:xA wherein Ln is at least one of La, Y, Gd, and Lu, X is at least one of Cl and Br, A is at least one of Ce and Tb, x is a number satisfying $0<x<0.1$, as disclosed in U.S. Pat. No. 4,236,078, a phosphor represented by the formula (Ba$_{1-x-y}$, Mg$_x$,Ca$_y$)FX:aEu$^{2+}$ wherein X is at least one of Cl and Br, x and y are numbers satisfying $0<x+y \leq 0.6$ and $xy \neq 0$, and a is a number satisfying $10^{-6} \leq a \leq 5 \times 10^{-2}$, as disclosed in DE-OS No. 2,928,245, a phosphor represented by the formula (Ba$_{1-x}$,M$^{2+}_x$)FX:yA wherein M$^{2+}$ is at least one of Mg, Ca, Sr, Zn, and Cd, X is at least one of Cl, Br, and I, A is at least one of Eu, Tb, Ce, Tm, Dy, Pr, Ho, Nd, Yb, and Er, x is a number satisfying $0 \leq x \leq 0.6$, and y is a number satisfying $0 \leq y \leq 0.2$, as disclosed in U.S. Pat. No. 4,239,968, a phosphor represented by the formula M$^{II}$FX·xA:yLn wherein M$^{II}$ is at least one of Ba, Ca, Sr, Mg, Zn, and Cd, A is at least one of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$, Ln is at least one of Eu, Tb, Ce, Tm, Dy, Pr, Ho, Nd, Yb, Er, Sm, and Gd, X is at least one of Cl, Br, and I, x is a number satisfying $5 \times 10^{-5} \leq x \leq 0.5$, and y is a number satisfying $0<y \leq 0.2$, as described in Japanese Unexamined Patent Publication No. 55(1980)-160078, a phosphor represented by the formula (Ba$_{1-x}$,M$^{II}_x$)F$_2$·aBaX$_2$:yEu,zA wherein M$^{II}$ is at least one of beryllium, magnesium, calcium, strontium, zinc, and cadmium, X is at least one of chlorine, bromine, and iodine, A is at least one of zirconium and scandium, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0<z \leq 10^{-2}$, as described in Japanese Unexamined Patent Publication No. 56(1981)-116777, a phosphor represented by the formula (Ba$_{1-x}$,M$^{II}_x$)F$_2$·aBaX$_2$:yEu, zB wherein M$^{II}$ is at least one of beryllium, magnesium, calcium, strontium, zinc, and cadmium, X is at least one of chlorine, bromine, and iodine, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0<z \leq 10^{-2}$, as described in Japanese Unexamined Patent Publication No. 57(1982)-23673, a phosphor represented by the formula (Ba$_{1-x}$,M$^{II}_x$)F$_2$·aBaX$_2$:yEu, zA wherein M$^{II}$ is at least one of beryllium, magnesium, calcium, strontium, zinc, and cadmium, X is at least one of chlorine, bromine, and iodine, A is at least one of arsenic and silicon, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0<z \leq 5 \times 10^{-1}$, as described in Japanese Unexamined Patent Publication No. 57(1982)-23675, a phosphor represented by the formula M$^{III}$OX:xCe wherein M$^{III}$ is at least one trivalent metal selected from the group consisting of Pr, Nd, Pm, Sm, Eu, Tb, Dy, Ho, Er, Tm, Yb, and Bi, X is either one or both of Cl and Br, and x is a number satisfying $0<x<0.1$, as described in Japanese Unexamined Patent Publication No. 58(1983)-69281, a phosphor represented by the formula Ba$_{1-x}$M$_{x/2}$L$_{x/2}$FX:yEU$^{2+}$ wherein M is at least one alkaline metal selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one halogen selected from the group consisting of Cl, Br, and I, x is a number satisfying $10^{-2} \leq x \leq 0.5$, and y is a number satisfying $0<y \leq 0.1$, as described in Japanese Unexamined Patent Publication No. 58(1983)-206678, a phosphor represented by the formula BaFX·xA:yEu$^{2+}$ wherein X is at least one halogen selected from the group consisting of Cl, Br, and I, A is a calcination product of a tetrafluoro boric acid compound, x is a number satisfying $10^{-6} \leq x \leq 0.1$, and y is a number satisfying $0<y \leq 0.1$, as described in Japanese Unexamined Patent Publication No. 59(1984)-27980, a phosphor represented by the formula BaFX·xA:yEu$^{2+}$ wherein X is at least one halogen selected from the group consisting of Cl, Br, and I, A is a calcination product of at least one compound selected from the hexafluoro compound group consisting of salts of hexafluoro silicic acid, hexafluoro titanic acid, and hexafluoro zirconic acid with monovalent or bivalent metals, x is a number satisfying $10^{-6} \leq x \leq 0.1$, and y is a number satisfying $0<y \leq 0.1$, as described in Japanese Unexamined Patent Publication No. 59(1984)-47289, a phosphor represented by the formula BaFX·xNaX':aEu$^{2+}$ wherein each of X and X' is at least one of Cl, Br, and I, x is a number satisfying $0<x \leq 2$, and a is a number satisfying $0<a \leq 0.2$, as described in Japanese Unexamined Patent Publication No. 59(1984)-56479, a phosphor represented by the formula M$^{II}$FX·xNaX':yEu$^{2+}$:zA wherein M$^{II}$ is at least one alkaline earth metal selected from the group consisting of Ba, Sr, and Ca, each of X and X' is at least one halogen selected from the group consisting of Cl, Br, and I, A is at least one transition metal selected from the group consisting of V, Cr, Mn, Fe, Co, and Ni, x is a number satisfying $0<x \leq 2$, y is a number satisfying $0<y \leq 0.2$, and z is a number satisfying $0<z \leq 10^{-2}$, as described in Japanese Unexamined Patent Publication No. 59(1984)-56480, a phosphor represented by the formula M$^{II}$FX·aM$^{I}$X'·bM$^{II}$X''$_2$·cM$^{III}$X'''$_3$·xA:yEu$^{2+}$ wherein M$^{II}$ is at least one alkaline earth metal selected from the group consisting of Ba, Sr, and Ca, M$^{I}$ is at least one alkali metal selected from the group consisting of Li, Na, K, Rb, and Cs, M$^{II}$ is at least one bivalent metal selected from the group consisting of Be and Mg, M$^{III}$ is at least one trivalent metal selected from the group consisting of Al, Ga, In, and Tl, A is a metal oxide, X is at least one halogen selected from the group consisting of Cl, Br, and I, each of X', X'', and X''' is at least one halogen selected from the group consisting of F, Cl, Br, and I, a is a number satisfying $0 \leq a \leq 2$, b is a number satisfying $0 \leq b \leq 10^{-2}$, c is a number satisfying $0 \leq c \leq 10^{-2}$, and $a+b+c \geq 10^{-6}$, x is a number satisfying $0<x \leq 0.5$, and y is a number satisfying $0<y \leq 0.2$, as described in Japanese Unexamined Patent Publication No. 59(1984)-75200, a stimulable phosphor represented by the formula M$^{II}$X$_2$·aM$^{II}$X'$_2$:xEu$^{2+}$ wherein M$^{II}$ is at least one alkaline earth metal selected from the group consisting of Ba, Sr, and Ca, each of X and X' is at least one halogen selected from the group consisting of Cl, Br, and I, and $X \neq X'$, a is a number satisfying $0.1 \leq a \leq 10.0$, and x is a number satisfying $0<x\leq0.2$, as described in Japanese Unexamined Patent Publication No. 60(1985)-84381, a stimulable phosphor represented by the formula $M^{II}FX \cdot aM^{I}X':xEu^{2+}$ wherein $M^{II}$ is at least one alkaline earth metal selected from the group consisting of Ba, Sr, and Ca, $M^{I}$ is at least one alkali metal selected from the group consisting of Rb and Cs, X is at least one halogen selected from the group consisting of Cl, Br, and I, X' is at least one halogen selected from the group consisting of F, Cl, Br, and I, a is a number satisfying $0\leq a\leq 4.0$, and x is a number satisfying $0<x\leq 0.2$, as described in Japanese Unexamined Patent Publication No. 60(1985)-101173, a stimulable phosphor represented by the formula $M^{I}X$:xBi wherein $M^{I}$ is at least one alkali metal selected from the group consisting of Rb and Cs, X is at least one halogen selected from the group consisting of Cl, Br, and I, and x is a number falling within the range of $0<x\leq 0.2$, as described in Japanese Unexamined Patent Publication No. 62(1987)-25189, and a cerium activated rare earth element oxyhalide phosphor represented by the formula LnOX:xCe wherein Ln is at least one of La, Y, Gd, and Lu, X is at least one of Cl, Br, and I, x is a number satisfying $0<x\leq 0.2$, the ratio of X to Ln, expressed in terms of the atomic ratio, falls within the range of $0.500<X/Ln\leq 0.998$, and a maximum wavelength λ of the stimulation spectrum falls within the range of 550 nm<λ<700 nm, as described in Japanese Unexamined Patent Publication No. 2(1990)-229882.

The stimulable phosphor represented by the formula $M^{II}X_2 \cdot aM^{II}X'_2:xEu^{2+}$, which is described in Japanese Unexamined Patent Publication No. 60(1985)-84381, may contain the additives described below in the below-mentioned proportions per mol of $M^{II}X_2 \cdot aM^{II}X'_2$:

$bM^{I}X''$ wherein $M^{I}$ is at least one alkali metal selected from the group consisting of Rb and Cs, X" is at least one halogen selected from the group consisting of F, Cl, Br, and I, and b is a number satisfying $0<b\leq 10.0$, as described in Japanese Unexamined Patent Publication No. 60(1985)-166379, $bKX'' \cdot cMgX_2 \cdot dM^{III}X'_3$ wherein $M^{III}$ is at least one trivalent metal selected from the group consisting of Sc, Y, La, Gd, and Lu, each of X", X, and X' is at least one halogen selected from the group consisting of F, Cl, Br, and I, b is a number satisfying $0\leq b\leq 2.0$, c is a number satisfying $0\leq c\leq 2.0$, d is a number satisfying $0\leq d\leq 2.0$, and $2\times 10^{-5}\leq b+c+d$, as described in Japanese Unexamined Patent Publication No. 60(1985)-221483, yB wherein y is a number satisfying $2\times 10^{-4}\leq y\leq 2\times 10^{-1}$, as described in Japanese Unexamined Patent Publication No. 60(1985)-228592, bA wherein A is at least one oxide selected from the group consisting of $SiO_2$ and $P_2O_5$, and b is a number satisfying $10^{-4}\leq b\leq 2\times 10^{-1}$, as described in Japanese Unexamined Patent Publication No. 60(1985)-228593, bSiO wherein b is a number satisfying $0<b\leq 3\times 10^{-2}$, as described in Japanese Unexamined Patent Publication No. 61(1986)-120883, $bSnX''_2$ wherein X" is at least one halogen selected from the group consisting of F, Cl, Br, and I, and b is a number satisfying $0<b\leq 10^{-3}$, as described in Japanese Unexamined Patent Publication No. 61(1986)-120885, $bCsX'' \cdot cSnX_2$ wherein each of X" and X is at least one halogen selected from the group consisting of F, Cl, Br, and I, b is a number satisfying $0<b\leq 10.0$, and c is a number satisfying $10^{-6}\leq c\leq 2\times 10^{-2}$, as described in Japanese Unexamined Patent Publication No. 61(1986)-235486, and $bCsX'' \cdot yLn^{3+}$ wherein X" is at least one halogen selected from the group consisting of F, Cl, Br, and I, Ln is at least one rare earth element selected from the group consisting of Sc, Y, Ce, Pr, Nd, Sm. Gd, Tb, Dy, Ho, Er, Tm, Yb, and Lu, b is a number satisfying $0<b\leq 10.0$, and y is a number satisfying $10^{-6}\leq y\leq 1.8\times 10^{-1}$, as described in Japanese Unexamined Patent Publication No. 61(1986)-235487.

Of the above-enumerated stimulable phosphors, the bivalent europium activated alkaline earth metal fluorohalide phosphor (e.g., BaFI:Eu), the europium activated alkali metal halide phosphor (e.g., CsBr:Eu), the bivalent europium activated alkaline earth metal halide phosphor containing iodine, the rare earth element-activated rare earth element oxyhalide phosphor containing iodine, and the bismuth activated alkali metal halide phosphor containing iodine exhibit light emission with a high luminance, are capable of yielding an image of good image quality, and therefore are preferable. The phosphors described above are capable of taking on the form of a pillar-shaped crystal and are apt to have the problems with regard to the water vapor absorption. However, with the constitution of the radiation image storage panel in accordance with the present invention, the water vapor proof characteristics are capable of being efficiently imparted with respect to the phosphors described above.

The stimulable phosphor layer may be overlaid on the substrate with a known technique, such as the vacuum evaporation technique or the coating technique.

With the vacuum evaporation technique, the substrate is located within a vacuum evaporation apparatus, and the vacuum evaporation apparatus is then evacuated to a degree of vacuum of approximately $10^{-4}$ Pa. Thereafter, at least one kind of stimulable phosphor is heated and evaporated with a resistance heating technique, an electron beam technique, or the like, and a layer of the stimulable phosphor is deposited to a desired thickness on the surface of the substrate. At this time, an inert gas, such as an Ar gas or a $N_2$ gas, may be introduced into the vacuum evaporation apparatus, such that the degree of vacuum may fall within the range of approximately 0.05 Pa to approximately 10 Pa. The vacuum evaporation process may be performed in a plurality of stages in order to form the stimulable phosphor layer. Also, in the vacuum evaporation process, a plurality of constituents for a desired stimulable phosphor may be co-evaporated by use of a plurality of resistance heaters or a plurality of electron beams. In this manner, the desired stimulable phosphor may be synthesized on the substrate, and the stimulable phosphor layer may thereby be formed on the substrate. After the vacuum evaporation process has been finished, the formed stimulable phosphor layer may be subjected to heat treatment.

With the coating technique, the stimulable phosphor, a binder, and a solvent are intimately mixed together. In this manner, a coating composition, in which the stimulable phosphor has been dispersed uniformly in the binder solution, is prepared. Thereafter, the coating composition is uniformly applied onto the surface of the substrate. In this manner, a coating film is formed on the surface of the substrate. The operation for applying the coating composition onto the substrate may be performed by utilizing ordinary coating means, such as a doctor blade coater, a roll coater, or a knife coater.

Ordinarily, the layer thickness of the stimulable phosphor layer falls within the range of 20 μm to 1 mm, depending upon the characteristics required of the radiation image storage panel, the kind of the stimulable phosphor, the mixing ratio of the binder to the stimulable phosphor, and the like. The layer thickness of the stimulable phosphor layer should preferably fall within the range of 50 μm to 500 μm.

Also, such that the spread of the stimulating rays and/or the light emitted by the stimulable phosphor may be suppressed, and such that the sharpness of the obtained image may thus be enhanced, the transparent thin film 4, the water vapor proof layer 6, or the adhesive layer 8 may be colored with a coloring agent, such as a pigment or a dye, which is capable of absorbing the stimulating rays and/or the light emitted by the stimulable phosphor. Particularly, in the cases of a radiation image read-out apparatus, wherein the radiation image storage panel, on which a radiation image has been stored, is scanned with a line-like laser beam acting as the stimulating rays, and wherein the light emitted by the stimulable phosphor of the radiation image storage panel is detected with a line scanner and with respect to each of pixels, it is desired that the spread of the light emitted by the stimulable phosphor is capable of being suppressed. In such cases, one of the layers constituting the radiation image storage panel should preferably be colored. The adhesive layer 8 of the radiation image storage panel should more preferably be colored. The adhesive layer 8 is capable of being colored comparatively easily such that the characteristics of the radiation image storage panel may not be adversely affected.

The substrate may be constituted of a material selected from various kinds of materials known as substrates for conventional radiation image storage panels. In the conventional radiation image storage panels, such that the binding strength between the substrate and the stimulable phosphor layer may be enhanced, or such that the sensitivity of the radiation image storage panel may be enhanced or an image having good image quality (with respect to sharpness and graininess) may be obtained with the radiation image storage panel, a high-molecular weight substance, such as gelatin, is applied onto the surface of the substrate, on which surface the stimulable phosphor layer is to be overlaid, in order to form an adhesive properties imparting layer, or a light reflecting layer constituted of a light reflecting substance, such as titanium dioxide, a light absorbing layer constituted of a light absorbing substance, such as carbon black, or the like, is formed on the surface of the substrate, on which surface the stimulable phosphor layer is to be overlaid. In the radiation image storage panel in accordance with the present invention, various such layers may be formed on the substrate. The layer constitution may be selected arbitrarily in accordance with the characteristics which the radiation image storage panel should have, and the like.

Also, as described in Japanese Unexamined Patent Publication No. 59(1984)-200200, such that an image having a high sharpness may be obtained, fine concavities and convexities may be formed on the surface of the substrate, on which surface the stimulable phosphor layer is to be overlaid. (In cases where the adhesive properties imparting layer, the light reflecting layer, the light absorbing layer, or the like, is formed on the surface of the substrate, on which surface the stimulable phosphor layer is to be overlaid, fine concavities and convexities may be formed on the surface of the layer formed on the substrate.)

The radiation image storage panel in accordance with the present invention will further be illustrated by the following non-limitative examples.

EXAMPLE 1

A soda-lime glass plate having a thickness of 8 mm, which had been subjected to washing with an alkali, washing with deionized water, and washing with isopropyl alcohol (IPA) in this order, was located as a substrate within a vacuum evaporation machine. Thereafter, CsBr and EuBr$_2$ acting as deposition materials were filled respectively in predetermined resistance heating vessels. The distance between the substrate and each of the deposition materials was set at 0.15 m. Thereafter, the vacuum evaporation machine was evacuated to a degree of vacuum of $1 \times 10^{-3}$ Pa. An Ar gas was then introduced into the vacuum evaporation machine, and the degree of vacuum within the vacuum evaporation machine was thereby set at 1 Pa. The substrate was then heated to a temperature of 100° C. with a heater. Thereafter, each of the deposition materials was heated, and a CsBr:Eu stimulable phosphor was deposited on the surface of the substrate at a rate of 10 μm/min. At this time, the resistance current of the heating apparatus was adjusted, such that the Eu/Cs molar concentration ratio of the stimulable phosphor might become equal to 0.003/1. After the vacuum evaporation was finished, the region within the vacuum evaporation machine was returned to the atmospheric pressure, and the substrate was taken out from the vacuum evaporation machine. It was found that a stimulable phosphor layer (layer thickness: 600 μm) having a structure, in which pillar-shaped crystals of the stimulable phosphor stood approximately vertically and close to one another, was formed on the substrate.

A heat-resistant peelable film (CT50, supplied by PANAC K.K.) having a thickness of approximately 51 μm, which had heat resistance and was capable of being separated in a post-process, was laminated with a 9 μm-thick PET film (acting as a transparent thin film), and a laminated film was thus formed. Thereafter, an SiO$_x$ water vapor proof layer was formed with a sputtering technique to a layer thickness of 100 nm on the side of the PET film of the laminated film. An adhesive layer (a polyester type of resin: Vylon 300, supplied by Toyobo Co., Ltd., a coating weight of 2 g/m$^2$, a layer thickness of 1.5 μm) was formed with a coating technique on the SiO$_x$ water vapor proof layer. The transparent water vapor proof film, which was constituted of the transparent thin film and the SiO$_x$ water vapor proof layer, was then laminated with the aforesaid stimulable phosphor layer, such that the side of the adhesive layer might stand facing the stimulable phosphor layer. Thereafter, the peelable film was separated from the transparent thin film of the laminated film, and a radiation image storage panel was thus obtained.

EXAMPLE 2

A radiation image storage panel was formed in the same manner as that in Example 1, except that the film thickness of the PET film was set at 6 μm.

EXAMPLE 3

A radiation image storage panel was formed in the same manner as that in Example 1, except that the film thickness of the PET film was set at 4.5 μm.

EXAMPLE 4

A radiation image storage panel was formed in the same manner as that in Example 1, except that the film thickness of the PET film was set at 1.4 μm.

EXAMPLE 5

A radiation image storage panel was formed in the same manner as that in Example 2, except that a PVA/SiO$_x$ hybrid layer (PS layer), in which the ratio of PVA:SiO$_x$=1:1, was formed with a sol-gel technique to a layer thickness of 600 nm on the SiO$_x$ water vapor proof layer.

EXAMPLE 6

A radiation image storage panel was formed in the same manner as that in Example 5, except that an SiO$_x$ water vapor proof layer was formed with a sputtering technique to a layer thickness of 100 nm on the PS layer.

EXAMPLE 7

A radiation image storage panel was formed in the same manner as that in Example 6, except that the layer thickness of the adhesive layer, which was applied on the SiO$_x$ water vapor proof layer, was set at 0.3 μm.

EXAMPLE 8

A radiation image storage panel was formed in the same manner as that in Example 6, except that the layer thickness of the adhesive layer, which was applied on the SiO$_x$ water vapor proof layer, was set at 0.5 μm.

EXAMPLE 9

A radiation image storage panel was formed in the same manner as that in Example 6, except that the layer thickness of the adhesive layer, which was applied on the SiO$_x$ water vapor proof layer, was set at 1.0 μm.

EXAMPLE 10

A radiation image storage panel was formed in the same manner as that in Example 6, except that the layer thickness of the adhesive layer, which was applied on the SiO$_x$ water vapor proof layer, was set at 1.9 μm.

COMPARATIVE EXAMPLE 1

A radiation image storage panel was formed in the same manner as that in Example 1, except that the layer thickness of the PET film was set at 12 μm.

COMPARATIVE EXAMPLE 2

A radiation image storage panel was formed in the same manner as that in Example 2, except that the SiO$_x$ water vapor proof layer was not formed.

COMPARATIVE EXAMPLE 3

A radiation image storage panel was formed with a process, wherein an SiO$_x$ water vapor proof layer was formed directly on the CsBr:0.003 Eu stimulable phosphor layer, which had been deposited on the substrate in the same manner as in Example 1. The SiO$_x$ water vapor proof layer was formed directly on the CsBr:0.003 Eu stimulable phosphor layer with a sputtering technique to a thickness of 100 nm.

COMPARATIVE EXAMPLE 4

The SiO$_x$ water vapor proof layer in Comparative Example 3 was not formed, and the thus obtained panel was taken as a radiation image storage panel.

COMPARATIVE EXAMPLE 5

A radiation image storage panel was formed in the same manner as that in Example 6, except that the layer thickness of the adhesive layer, which was applied on the SiO$_x$ water vapor proof layer, was set at 0.1 μm.

COMPARATIVE EXAMPLE 6

A radiation image storage panel was formed in the same manner as that in Example 6, except that the layer thickness of the adhesive layer, which was applied on the SiO$_x$ water vapor proof layer, was set at 2.5 μm.

(Evaluation Methods)

The radiation image storage panels having been formed in Examples in accordance with the present invention and Comparative Examples described above were evaluated with respect to a water vapor transmission rate of the combination of the PET film and the water vapor proof layer, image sharpness, and a sensitivity lowering rate. The results shown in Table 1 below were obtained. As the water vapor transmission rate of the combination of the PET film and the water vapor proof layer, the amount of water vapor passing through the combination of the PET film and the water vapor proof layer having an area of 1 m$^2$ per 24 hours under environmental conditions of 40° C. and 90% RH was measured. Also, the image sharpness and the sensitivity lowering rate were measured in the manner described below.

<Image Sharpness>

X-rays having been produced at a tube voltage of 80 kVp were irradiated to the radiation image storage panel. Thereafter, the radiation image storage panel was scanned with linear stimulating rays (wavelength: 660 nm) produced by a line-like LD laser, and the stimulable phosphor layer of the radiation image storage panel was thus stimulated with the stimulating rays to emit light. The emitted light was detected and converted into an electric signal by use of a CCD array comprising a plurality of photoelectric conversion devices, which were arrayed along the length direction of the linear area of the radiation image storage panel exposed to the linear stimulating rays produced by the line-like LD laser. An image was then reproduced from the electric signal by use of an image reproducing apparatus, and the reproduced image was displayed on a displaying apparatus. The thus obtained image was analyzed with a computer, and a modulation transfer function (MTF) (frequency: 1 cycle/mm) of the image was obtained. The MTF values of the radiation image storage panels having been formed in Examples in accordance with the present invention and Comparative Examples described above were calculated as relative values with the MTF value of the radiation image storage panel, which was formed in Comparative Example 4, being taken as 100. A high MTF value represents high image sharpness.

<Sensitivity Lowering Rate>

The original intensity of the light emitted by the radiation image storage panel was measured in the same manner as that for the measurement of the image sharpness. Thereafter, the radiation image storage panel was left to stand for 30 days under environmental conditions of 30° C. and 80% RH, and the intensity of the light emitted by the radiation image storage panel was measured in the same manner as that described above. The lowering rate (in %) of the intensity of the emitted light from the original intensity of the emitted light was calculated as the sensitivity lowering rate.

<Adhesion Force>

The combination of the adhesive layer and the protective layer was slit to a width of 1 cm, and the adhesion force was measured with a tensile testing machine under conditions of 180° peeling and a rate of pulling of 1 cm/min.

In the column for the water vapor proof layer in Table 1, I represents the 100 nm-thick $SiO_x$ layer, II represents the 100 nm-thick $SiO_x$ layer/600 nm-thick PS layer, and III represents the 100 nm-thick $SiO_x$ layer/600 nm-thick PS layer /100 nm-thick $SiO_x$ layer.

TABLE 2

| | Adhesive layer thickness (µm) | MTF (1 cycle/mm) relative value | Adhesion force (N/cm) | Evaluation |
|---|---|---|---|---|
| Ex. 6 | 1.5 | 94 | 1.2 | ⊚ |
| Ex. 7 | 0.3 | 97 | 0.2 | ○ |
| Ex. 8 | 0.5 | 96 | 0.5 | ⊚ |
| Ex. 9 | 1.0 | 95 | 0.8 | ⊚ |
| Ex. 10 | 1.9 | 92 | 1.5 | ○ |
| Comp. Ex. 5 | 0.1 | 97 | Smaller than 0.1 | X |
| Comp. Ex. 6 | 2.5 | 83 | 2.1 | X |

With respect to the radiation image storage panels formed in Examples 6, 7, 8, 9, and 10 and Comparative Examples 5 and 6, the relative MTF value and the adhesion force were measured for different layer thicknesses of the adhesive

TABLE 1

| | PET film thickness (µm) | Water vapor proof layer | Adhesive layer | Water vapor trans-mission rate of combination of PET film and water vapor proof layer (g/m²/day) | MTF (1 cycle/mm) relative value | Sensitivity lowering rate | Overall evaluation |
|---|---|---|---|---|---|---|---|
| Ex. 1 | 9 | I | Provided | 0.8 | 92 | 4% | ○ |
| Ex. 2 | 6 | I | Provided | 0.8 | 95 | 4% | ○ |
| Ex. 3 | 4.5 | I | Provided | 0.8 | 97 | 4% | ○ |
| Ex. 4 | 1.4 | I | Provided | 1.0 | 99 | 5% | ○ |
| Ex. 5 | 6 | II | Provided | 0.5 | 94 | 2% | ○ |
| Ex. 6 | 6 | III | Provided | Lower than 0.1 | 94 | Lower than 1% | ○ |
| Comp. Ex. 1 | 12 | I | Provided | 0.8 | 87 | 4% | X |
| Comp. Ex. 2 | 6 | None | Provided | 60 | 95 | 30% | X |
| Comp. Ex. 3 | None | I | None | Could not be measured | 100 | 13% | X |
| Comp. Ex. 4 | None | None | None | — | 100 | 30% | X |

Each of the radiation image storage panels formed in Examples 1, 2, 3, and 4 exhibited no wrinkling of the PET film. Also, each of the radiation image storage panels formed in Examples 1, 2, 3, and 4 exhibited a low water vapor transmission rate, high image sharpness, and a low sensitivity lowering rate. However, the radiation image storage panel formed in Comparative Example 1, wherein the thickness of the transparent thin film was larger than 10 µm, exhibited a low image sharpness. Also, the radiation image storage panel formed in Comparative Example 2, wherein no water vapor proof layer was provided, exhibited a high water vapor transmission rate and a markedly high sensitivity lowering rate. Further, with the radiation image storage panel formed in Comparative Example 3, wherein the $SiO_x$ water vapor proof layer was formed directly on the stimulable phosphor layer with the sputtering technique, though the image shaprness was high due to the absence of the transparent thin film, the sensitivity lowering rate was high. With the radiation image storage panel formed in Comparative Example 3, wherein the $SiO_x$ water vapor proof layer was formed directly on the stimulable phosphor layer with the sputtering technique, the water vapor transmission rate was not capable of being measured.

layers. The results shown in Table 2 were obtained. As shown in Table 2, in cases where the layer thickness of the adhesive layer was as small as 0.1 µm (as in Comparative Example 5), sufficient adhesion force was not capable of being obtained. Also, in cases where the layer thickness of the adhesive layer was as large as 2.5 µm (as in Comparative Example 6), the relative MTF value became small. In cases where the layer thickness of the adhesive layer fell within the range of approximately 0.3 µm to approximately 2 µm, good image sharpness and good durability were capable of being obtained.

As described above, the radiation image storage panel in accordance with the present invention comprises the substrate, the stimulable phosphor layer, which is constituted of the stimulable phosphor, and the transparent water vapor proof film, which is constituted of the water vapor proof layer and the transparent thin film. The substrate, the stimulable phosphor layer, and the transparent water vapor proof film are overlaid in this order. The transparent water vapor proof film is overlaid via the adhesive layer on the stimulable phosphor layer. Also, the transparent thin film has a thickness falling within the range of 1 µm to 10 µm. Therefore, the radiation image storage panel in accordance with the present invention was capable of yielding an image having a good sharpness. Also, with the radiation image storage panel in accordance with the present invention, the water vapor proof layer prevented the stimulable phosphor from deteriorating due to absorption of water vapor. Accordingly, the radiation image storage panel in accordance with the present invention exhibited little deterioration in image quality during a long period of use.

Further, in the Examples in accordance with the present invention, the radiation image storage panel in accordance with the present invention was obtained with the process comprising the steps of: (a) laminating the transparent thin film and the peelable film with each other, the laminated film being thereby obtained, (b) overlaying the water vapor proof layer on the side of the transparent thin film of the laminated film, the transparent water vapor proof film, which is constituted of the transparent thin film and the water vapor proof layer, being thereby formed, (c) overlaying the transparent water vapor proof film on the stimulable phosphor layer via the adhesive layer, and (d) separating the peelable film from the transparent water vapor proof film. Therefore, the transparent thin film did not suffer from wrinkling. Also, by virtue of the use of the peelable film, even though the thickness of the transparent thin film was small, the water vapor proof layer was capable of being formed uniformly. Therefore, the radiation image storage panel in accordance with the present invention was capable of yielding an image having a high sharpness and good image quality and is capable of exhibiting good water vapor proof characteristics.

What is claimed is:

1. A phosphor panel, comprising:
   i) a substrate,
   ii) a phosphor layer, which is constituted of a phosphor, and
   iii) a transparent water vapor proof film, which is constituted of a water vapor proof layer and a transparent thin film,
   the substrate, the phosphor layer, and the transparent water vapor proof film being overlaid in this order,
   the transparent water vapor proof film being overlaid via an adhesive layer on the phosphor layer,
   wherein the transparent thin film has a thickness falling within the range of 1 µm to 10 µm,
   wherein the transparent water vapor proof film has a water vapor transmission rate of at most 1 $g/m^2/day$, and
   wherein the adhesive layer has a layer thickness falling within the range of 0.3 µm to 2 µm.

2. A phosphor panel as defined in claim 1 wherein the transparent thin film has a thickness falling within the range of 2 µm to 7 µm.

3. A phosphor panel as defined in claim 1 wherein the transparent water vapor proof film has a water vapor transmission rate of at most 0.2 $g/m^2/day$.

4. A phosphor panel as defined in claim 1 wherein the water vapor proof layer is formed with a vacuum deposition technique, and
   a coating layer is formed on at least either one of two surfaces of the water vapor proof layer.

5. A phosphor panel as defined in claim 3 wherein the water vapor proof layer is formed with a vacuum deposition technique, and
   a coating layer is formed on at least either one of two surfaces of the water vapor proof layer.

6. A phosphor panel as defined in claim 4 wherein the radiation image storage panel further comprises a stimulating ray anti-reflection layer.

7. A phosphor panel as defined in claim 5 wherein the radiation image storage panel further comprises a stimulating ray anti-reflection layer.

8. A phosphor panel as defined in claim 6 wherein the radiation image storage panel further comprises an emitted light anti-reflection layer.

9. A phosphor panel as defined in claim 7 wherein the radiation image storage panel further comprises an emitted light anti-reflection layer.

10. A phosphor panel as defined in claim 8 wherein the phosphor is a pillar-shaped crystal.

11. A phosphor panel as defined in claim 9 wherein the phosphor is a pillar-shaped crystal.

12. A phosphor panel as defined in claim 1 wherein the radiation image storage panel is obtained with a process comprising the steps of:
    a) laminating the transparent thin film and a peelable film with each other, a laminated film being thereby obtained,
    b) overlaying the water vapor proof layer on the side of the transparent thin film of the laminated film, the transparent water vapor proof film, which is constituted of the transparent thin film and the water vapor proof layer, being thereby formed,
    c) overlaying the transparent water vapor proof film on the phosphor layer via the adhesive layer, and
    d) separating the peelable film from the transparent water vapor proof film.

13. A phosphor panel as defined in claim 3, wherein the radiation image storage panel is obtained with a process comprising the steps of:
    a) laminating the transparent thin film and a peelable film with each other, a laminated film being thereby obtained,
    b) overlaying the water vapor proof layer on the side of the transparent thin film of the laminated film, the transparent water vapor proof film, which is constituted of the transparent thin film and the water vapor proof layer, being thereby formed,
    c) overlaying the transparent water vapor proof film on the phosphor layer via the adhesive layer, and
    d) separating the peelable film from the transparent water vapor proof film.

14. A phosphor panel as defined in claim 4 wherein the radiation image storage panel is obtained with a process comprising the steps of:
    a) laminating the transparent thin film and a peelable film with each other, a laminated film being thereby obtained,
    b) overlaying the water vapor proof layer on the side of the transparent thin film of the laminated film, the transparent water vapor proof film, which is constituted of the transparent thin film and the water vapor proof layer, being thereby formed,
    c) overlaying the transparent water vapor proof film on the phosphor layer via the adhesive layer, and
    d) separating the peelable film from the transparent water vapor proof film.

15. A phosphor panel as defined in claim 6 wherein the radiation image storage panel is obtained with a process comprising the steps of:
    a) laminating the transparent thin film and a peelable film with each other, a laminated film being thereby obtained,
    b) overlaying the water vapor proof layer on the side of the transparent thin film of the laminated film, the transparent water vapor proof film, which is constituted of the transparent thin film and the water vapor proof layer, being thereby formed, c) overlaying the transparent water vapor proof film on the phosphor layer via the adhesive layer, and d) separating the peelable film from the transparent water vapor proof film.

16. A phosphor panel as defined in claim 8 wherein the radiation image storage panel is obtained with a process comprising the steps of:

a) laminating the transparent thin film and a peelable film with each other, a laminated film being thereby obtained, b) overlaying the water vapor proof layer on the side of the transparent thin film of the laminated film, the transparent water vapor proof film, which is constituted of the transparent thin film and the water vapor proof layer, being thereby formed, c) overlaying the transparent water vapor proof film on the phosphor layer via the adhesive layer, and d) separating the peelable film from the transparent water vapor proof film.

17. A phosphor panel as defined in claim 10 wherein the radiation image storage panel is obtained with a process comprising the steps of:

a) laminating the transparent thin film and a peelable film with each other, a laminated film being thereby obtained, b) overlaying the water vapor proof layer on the side of the transparent thin film of the laminated film, the transparent water vapor proof film, which is constituted of the transparent thin film and the water vapor proof layer, being thereby formed, c) overlaying the transparent water vapor proof film on the phosphor layer via the adhesive layer, and d) separating the peelable film from the transparent water vapor proof film.

* * * * *